No. 729,100. PATENTED MAY 26, 1903.
E. A. SPERRY.
SEPARATOR FOR STORAGE BATTERIES.
APPLICATION FILED NOV. 25, 1901.
NO MODEL.
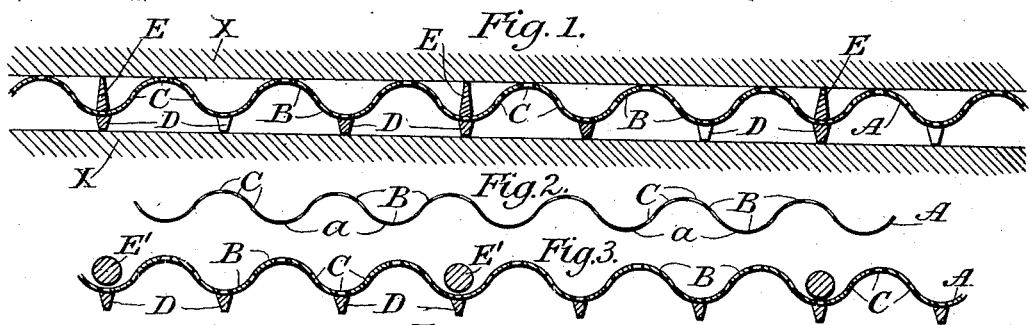
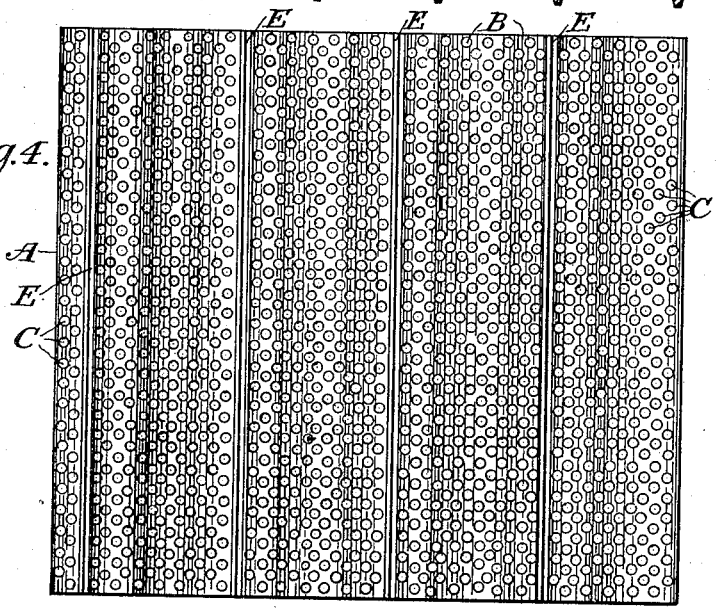
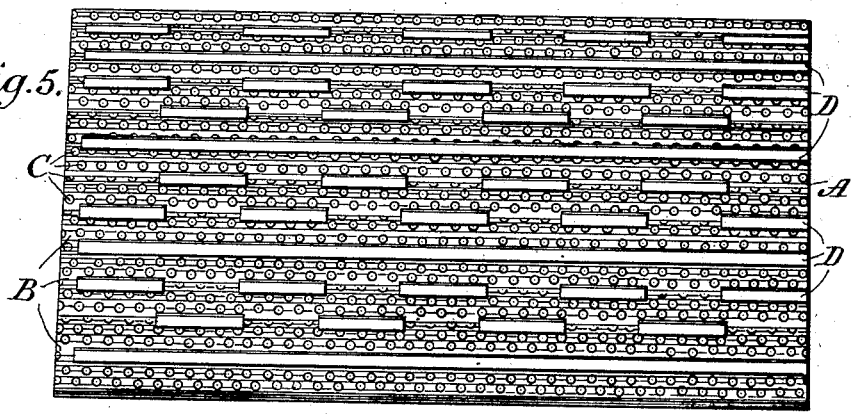
Witnesses
Inventor
Elmer A. Sperry
By his Attorneys
Redding Kiddle Greeley No. 729,100. Patented May 26, 1903.

UNITED STATES PATENT OFFICE.

ELMER A. SPERRY, OF CLEVELAND, OHIO, ASSIGNOR TO NATIONAL BATTERY COMPANY, OF JERSEY CITY, NEW JERSEY, AND CLEVELAND, OHIO, A CORPORATION OF NEW JERSEY.

SEPARATOR FOR STORAGE BATTERIES.

SPECIFICATION forming part of Letters Patent No. 729,100, dated May 26, 1903.

Application filed November 25, 1901. Serial No. 83,491. (No model.)

*To all whom it may concern:*

Be it known that I, ELMER A. SPERRY, a citizen of the United States, residing at Cleveland, in the county of Cuyahoga, in the State of Ohio, have invented certain new and useful Improvements in Separators for Storage Batteries, of which the following is a specification.

This invention relates to separators for the elements of storage batteries; and the invention consists in forming a separator that shall be heat-resisting and that shall be slightly resilient and at the same time preserve sufficient rigidity to hold the elements, active material, or adjacent envelops in their proper relation and position.

In the accompanying drawings, Figure 1 represents a transverse section of an improved separator, showing the same in its operative position. Fig. 2 is a diagrammatic view of another form of separator. Fig. 3 represents a transverse section, showing another form of struts or supports for the separator. Fig. 4 represents a top plan view of the separator shown in Fig. 1. Fig. 5 is a bottom plan view of the same.

The separator comprises a sheet or plate A, of hard rubber, vulcanite, or gutta-percha, that is provided with suitable corrugations B and also with a plurality of perforations C, which permit the traverse of the ions from one battery element or plate to the other. The corrugations B are formed in the plate while the same is being vulcanized or revulcanized, so as to remain unaffected if at any time they should become unduly heated and to provide the requisite resilience. Heretofore the plates from which battery-separators have been made were vulcanized in the form of flat sheets, which were then heated to render them ductile, after which they were corrugated by being subjected to the action of metal rollers. It has been observed, however, that these substances, and also celluloid, but in a less degree, will always tend to assume the shape or form in which they were originally vulcanized if reheated, and it is to overcome this tendency to straighten out and to preserve the resiliency of the separator that it is vulcanized or revulcanized while being held in its corrugated position.

Preferably the separator is provided on one side with a plurality of projections D, which extend slightly beyond the plane of the corrugations to hold the separator out of contact with the adjacent battery element. Said projections are preferably secured to every other convolution or roll in the plate and are arranged irregularly or "staggered," as shown in Fig. 5. The other side of the plate is provided with a plurality of struts or supports E, having their tops approximately flush with the plane of the corrugations. These struts form additional points of contact with the battery-plate and assist in preventing the separator from being pressed flat in case the battery elements should be subjected to a strain tending to force them together. As shown in Fig. 3, however, small rolls or strands of rubber or other suitable insulating material E' may be substituted for the struts E, if desired. Preferably the projections D immediately opposite the struts E are not interrupted, but extend lengthwise of the separator, as shown in Fig. 5. Both the struts and projections may be omitted, however, as shown in Fig. 2, and the separator may contact directly with the battery-plates. In this case, however, the part *a* of the plate which contacts with the active material is not perforated in order to prevent a short circuit being established between the elements or plates by means of the material that may be dislodged therefrom. Consequently only a portion of the plate can be provided with perforations instead of practically the whole plate, as in the other construction shown.

Since the separators herein described are heat-proof, they do not crumble and disintegrate when subjected to low temperatures. The separators also have sufficient resiliency to permit a slight movement of the battery elements or plates with relation to each other without injury either to the battery elements or the separators themselves. By this construction also an uninterrupted passage of the ions is permitted without the possibility of a short circuit being established if any of the active material of the battery-plates is dislodged.

Although the separator has been described in detail, it is obvious that various changes may be made therein without departing from the spirit of the invention provided the means set forth in any one of the following claims be employed.

I claim as my invention—

1. A perforated separator for storage batteries comprising a thin sheet having corrugations formed therein to render same slightly resilient, said corrugations being formed during vulcanization or revulcanization whereby they are unaffected by heat.

2. A separator for storage-battery elements comprising a thin corrugated sheet provided with a plurality of perforations, and means on said sheet to hold said perforations out of contact with one of said battery elements.

3. A separator for storage-battery elements comprising a thin corrugated sheet having perforations formed therein, said separator being provided with projections to hold same out of contact with one of the battery elements.

4. A separator for storage-battery elements comprising a thin corrugated sheet having perforations formed therein and engaging directly with one of the battery elements, in combination with additional supports interposed between said battery elements and the separator.

5. A separator for storage-battery elements comprising a thin perforated sheet having corrugations formed therein during vulcanization or revulcanization, said separator being provided on one side with projections to hold same out of contact with one of the battery elements and prevent a short circuit and additional supports engaging with the opposite side of said separator and with the adjacent battery element to prevent said separator from being flattened, substantially as described.

In testimony whereof I sign this application, in the presence of two witnesses, this 19th day of November, 1901.

ELMER A. SPERRY.

Witnesses:
ANTHONY N. JESBERA,
LUCIUS E. VARNEY.